Patented Sept. 19, 1933

1,927,166

UNITED STATES PATENT OFFICE 1,927,166

METHOD OF ADHESIVELY JOINING ONE MATERIAL TO ANOTHER

Alexander Frieden, New Rochelle, N. Y., assignor, by mesne assignments, to American Sealcone Corporation, New York, N. Y., a corporation of New York No Drawing. Application November 14, 1930
Serial No. 495,789

1 Claim. (Cl. 154—40)

This invention relates to a composition or solution to be applied to gelatin or glue substances and chemically react with the gelatin to first render it viscid and after the gelatin has been rendered viscid progressively effect a quick hardening or setting of the gelatine, and it is the object of the invention to provide an improved composition or solution for this purpose which is highly efficient in use.

The solution is particularly applicable for use in rendering viscid the gelatin coating applied to a surface of a material, such as paper, fabric and the like, preparatory to adhesively securing the same to the surface of a material relative to which the gelatin coated material is juxtaposed and effect a uniting or joining of the materials by adhesion of the gelatin, as in the making of paper container bodies wherein a blank is shaped to tubular form and adhesively united at the marginal portions of the blank.

The composition is composed of a soluble salt of a trivalent metal, such as aluminum, chromium or iron, in solution and combining therewith a suitable soluble material or substance in sufficient quantity to bring the concentration to an acidity below the pH value of 5.2 and above the pH value of 3.5, and said substance also having the property to serve as a buffer in the composition.

In producing the composition or solution the soluble trivalent metallic salt, such as aluminum sulphate, iron chloride or chromium sulphate is dissolved in water and there is added thereto an alkali or alkaline salt, such as sodium hydroxide in solution or sodium sulphate, until the hydrogen ion concentration is brought to a pH value between 5.2 and 3.5.

The solution of the salt of the trivalent metal has a pH value of about 3.5 or lower. In order that it shall react with the gelatin to produce the result of first rendering the gelatin viscid and then set the same the acidity or pH value of the solution is raised to above the pH value of 3.5 but below the pH value of 5.2, a solution having a pH value of 4.2 having been found to act efficiently. To raise the solution of the salt of the trivalent metal to the desired pH value I add thereto an alkali or alkaline salt, such as sodium hydroxide, potassium hydroxide or sodium carbonate, or a neutral salt, such as sodium sulphate or sodium chloride. The addition of such a material to the solution of the trivalent metallic salt does not only act to bring the solution to the desired pH value but the salts formed during the reaction also act as buffers.

The proportion of the addition of the material to bring the trivalent metal salt solution to the desired pH value is dependent upon the pH value of such solution. Should the trivalent metallic salt solution comprise a two per cent. solution of aluminum sulphate there is added thereto a twenty per cent. solution of sodium hydroxide until the desired pH value is obtained. The precipitate formed by the reaction of the sodium hydroxide solution with the aluminum sulphate solution is filtered off, preferably after the mixture has been standing for twenty-four hours so as to allow all of the precipitate to settle out, the resultant product constituting the moistening solution. Should the trivalent metallic salt solution comprise a one per cent. solution of aluminum sulphate there is added thereto in the proportion of 100 grams of a one per cent. aluminum sulphate solution 7 grams of sodium sulphate. After all of the sodium sulphate has been dissolved in the aluminum sulphate solution the solution is ready for use and no filtering is necessary, the solution having a pH value of about 4.4.

In use the solution is applied to the surface of the gelatin and by the chemical action of the solution on the gelatin the gelatin is first rendered viscid and after it reaches a viscid state immediately a hardening and setting of the gelatin takes place.

Having thus described my invention, I claim:

The method of adhesively joining a gelatin coated surface of a material to another material, which consists in providing a composition composed of aqueous solution of a trivalent metallic salt and an alkali to obtain therein a pH value above 3.5 and below 5.2, then applying the composition to the gelatin coated surface of the one material, and then applying the gelatin coated surface to the other material.

ALEXANDER FRIEDEN.